United States Patent
Trost et al.

[19]

[11] Patent Number: 6,142,434
[45] Date of Patent: Nov. 7, 2000

[54] UTILITY POLE CLAMP

[76] Inventors: Michael D. Trost, 779 Main St.; Scot M. Brinkman, 713 W. Main St., both of Wabasso, Minn. 56293

[21] Appl. No.: 09/070,193

[22] Filed: Apr. 30, 1998

Related U.S. Application Data

[60] Provisional application No. 60/051,395, Jul. 1, 1997.
[51] Int. Cl.⁷ .................................................... F24H 9/06
[52] U.S. Cl. .................... 248/218.4; 24/270; 248/219.4; 248/230.9
[58] Field of Search ........................... 248/218.4, 219.1, 248/219.3, 226.12, 216.1, 217.3, 227.3, 230.8, 230.9; 24/270, 279, 278

[56] References Cited

U.S. PATENT DOCUMENTS

| | | | |
|---|---|---|---|
| 1,050,364 | 1/1913 | Kobert | 248/230.8 X |
| 1,053,684 | 2/1913 | Vogel | 439/795 |
| 1,628,623 | 5/1927 | Jonnes | 211/107 |
| 2,706,023 | 4/1955 | Merritt | 52/148 |
| 2,915,799 | 12/1959 | Andreasen | 24/270 |
| 3,434,682 | 3/1969 | Nestlerode, Sr. | 248/68.1 |
| 4,186,468 | 2/1980 | Zaniewski | 24/483 |
| 5,098,051 | 3/1992 | Aldridge et al. | 248/230.9 |
| 5,174,535 | 12/1992 | Stubberfield | 248/316.1 |
| 5,228,657 | 7/1993 | Hall | 248/230.9 |

*Primary Examiner*—Anita M. King
*Attorney, Agent, or Firm*—Haugen Law Firm PLLP

[57] ABSTRACT

A multi-purpose utility pole clamp capable of supporting overhead lines or cables and adhering any of a variety of fixtures to a utility pole without the need for a traditional through-bolt fastening mechanism. The utility pole clamp of the present invention includes an electrically conductive band member for placement about the circumference of the utility pole, a locking mechanism for resiliently biasing the band member against the utility pole to thereby fixedly yet flexibly secure the band member to the utility pole, and a mounting block having at least one receiving aperture for rigidly coupling any of a variety of utility pole fixtures to the band member.

1 Claim, 5 Drawing Sheets

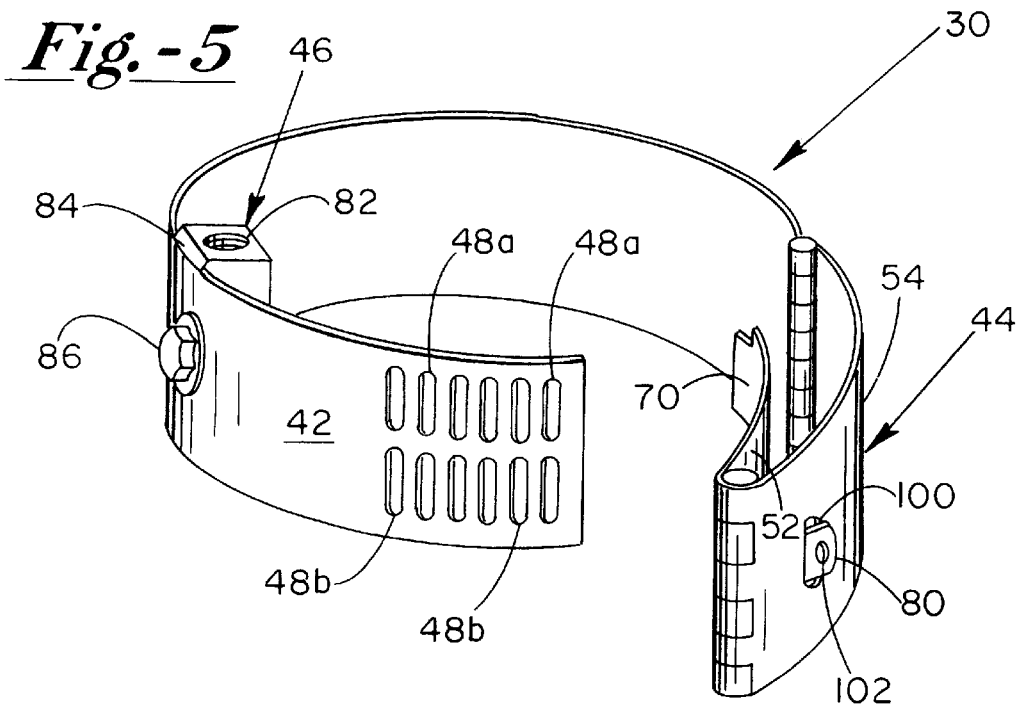
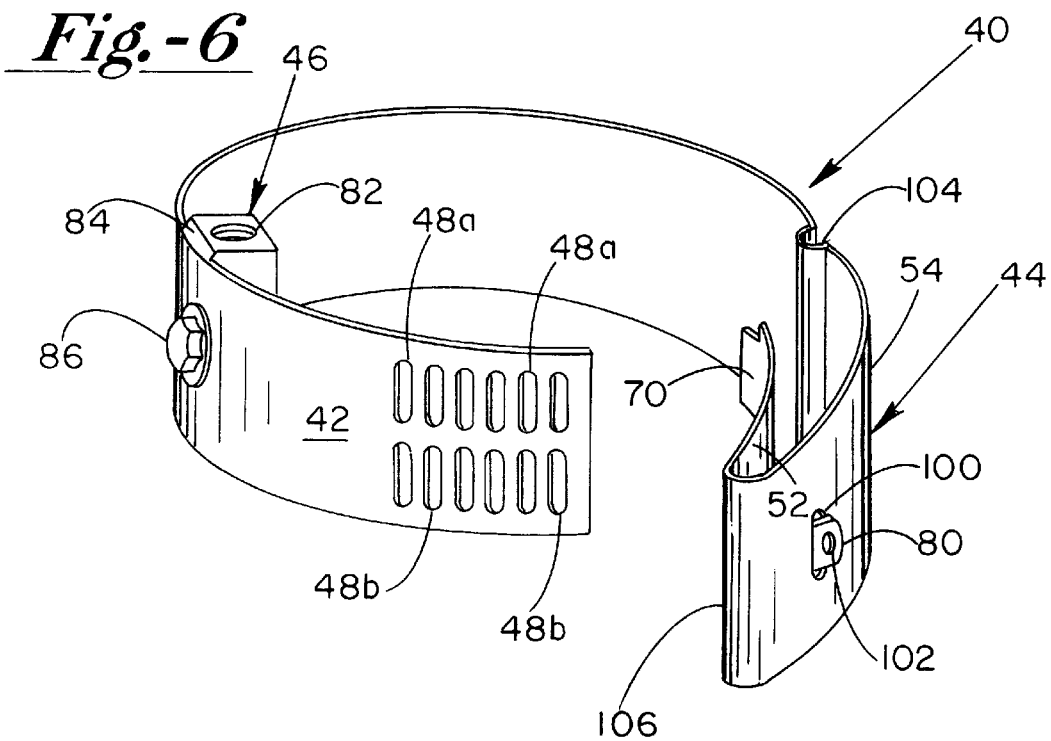

UTILITY POLE CLAMP

CROSS-REFERENCE TO RELATED APPLICATIONS

The present application relates to that certain Provisional Application Serial No. 60/051,395 filed Jul. 1, 1997 of Michael D. Trost and Scot M. Brinkman, entitled "UTILITY POLE CLAMP".

BACKGROUND OF THE INVENTION

I. Field of the Invention

The present invention relates generally to utility poles. More particularly, the present invention relates to a multi-purpose utility pole clamp capable of supporting overhead lines or cables, including transmission lines for electrical signals such as electrical fencing and other applications, and adhering any of a variety of fixtures to the utility pole without the need for a traditional through-bolt fastening mechanism.

II. Discussion of the Prior Art

For years, utility poles have been used to carry overhead lines or cables for supporting power generation, transmission and distribution lines, telephone lines and more recently cable television lines. The task of supporting these wires and/or cables is typically accomplished through the use of a variety of different fixtures, including insulators for providing electrical isolation between the wires/cables and the utility pole, eye bolts for attaching guy wires to the utility pole, cross arm members for supporting the insulators and wires laterally away from the utility pole, and brace members for providing structural support to the cross arm members. Fixtures such as these are commonly adhered to the utility pole via a traditional through-bolt fastening mechanism characterized by passing an elongated bolt through a bore formed in the utility pole for attachment to mating nut member. While this fastening mechanism is generally effective in supporting such fixtures, a multitude of substantial drawbacks nonetheless exist which consequently precipitate the need for the present invention.

Several prominent drawbacks with through bolt fastening mechanisms relate to the need for bores extending through the utility pole for receiving the elongated bolts. A first drawback related to the through bores is that they are disadvantageously expensive in terms of both the labor and time required to create them. Moreover, in many instances the bores must be created while the lineman is at the top of the utility pole which, as will be appreciated, presents a substantial challenge to the lineman in manipulating the drilling devices used to fashion such bores. A still further drawback with through bores is that they allow moisture to migrate into the interior of the utility pole, thereby increasing the likelihood of premature decay and deterioration.

Another drawback with through-bolt fastening mechanisms are quite cumbersome and time consuming to implement. This stems, in large part, from the fact that utility poles typically vary in diameter such that a lineman must carry a wide variety of bolt sizes and related hardware at all times to handle any installation and/or repair task. Requiring the lineman to carry such a wide variety of hardware at all times can be physically burdensome due to the weight of such articles, especially during instances when the lineman must walk long distances to remote work sites which are inaccessible except by foot. In similar fashion, the weight of such hardware may also present difficulties for the lineman while ascending and descending the utility pole to perform installation and/or repair operations.

Further problems stem from the fact that the lineman must manually handle and negotiate a multitude of different components while disposed on the top of the utility pole in order to install or repair such through-bolt fastening mechanisms. For example, handling the multitude of parts requires a great deal of manual dexterity on the part of the lineman such that an increased likelihood exists of having the lineman fumble or drop parts during such installation and/or repair operations. Moreover, it is typically quite time consuming and laborious to assemble the bolt hardware during such operations. This translates into increased labor costs, an increased likelihood of having the lineman suffer from chronic fatigue and/or carpal tunnel syndrome, and an increased likelihood of overexposing the lineman to adverse and potentially dangerous weather conditions when conducting repair operations in emergency situations.

Still other problems relate to the physical arrangement of the bolts while coupled to a utility pole. One such drawback is that the bolts extend through the center of the utility pole when installed. The metallic nature of the bolts creates a line of conductivity through the utility pole such that, in the case of a lightning strike, the resulting electrical charge is concentrated within the center of the pole. As will be appreciated by those skilled in the art, directing the electrical charge of a lightning strike into the center of the utility pole creates an increased likelihood of having the utility pole burst, split, or become otherwise structurally damaged. This jeopardizes not only the structural integrity of the utility pole, but also the structural integrity of the various fixtures as attached to the poles. In either event, an increased risk arises of having downed utility poles and/or wires which consequently raises concerns of safety and high repair and/or replacement costs.

Another related drawback stems from that fact that the bolt and nut arrangements typically extend well past the circumference of the utility pole when fully installed. This can be problematic from the standpoint of having the clothes of the lineman snag on the bolts or nuts while working on the utility pole which, at the very least, may impede the actions of the lineman. The outwardly extending bolts members may also present snagging problems during the installation of rubber insulating covers which are typically employed in conjunction with utility poles, thereby increasing the time and energy required to perform such operations. Bolts present the additional danger of possibly piercing the insulation barrier and expose the lineman or other technician to the dangers of the electrical energy being transmitted by the carrier.

A still further drawback stems from the fact that utility poles typically experience a fair degree of contraction and expansion due to changes in temperature, humidity, age, etc. . . . More specifically, the bolt and nut arrangement of through-bolt fastening mechanisms tend to loosen over time due to such expansion and contraction of the utility poles. This tendency for loosening requires a lineman to visit each utility pole on a regular basis for the purpose of re-tightening such components, thereby increasing the labor costs associated with maintaining the utility poles. Moreover, such loosening creates the possibility of having the various fixtures becoming detached from the utility poles, thereby raising the specter of having downed power, television, and cable lines.

A need therefore exists for an improved fastening mechanism for attaching power transmission and related fixtures to utility poles. The improved fastening mechanism should eliminate the need for through bores in the utility poles and be light weight and easy to work with such that a lineman can readily perform the required operations in quick fashion with minimal physical exertion. The improved fastening mechanism should reduce the overall number of parts which a lineman must handle while at the top of the utility pole so as to minimize the chance of fumbling or dropping parts during installation and/or repair operations. Furthermore, the improved fastening mechanism should dissipate the electricity from a lightning strike away from the center of the utility pole so as to protect the structural integrity of the utility pole and the various fixtures. The improved fastening mechanism should also be low profile relative to the circumference of the utility pole so as to minimize the risk of snagging or damaging the lineman's protective clothing and/or rubber insulating covers.

Moreover, the improved fastening mechanism should be capable of flexing to accommodate the contraction and expansion of utility poles without loosening while at the same time providing a sturdy attachment such that the fixtures will not shift or slide down the utility pole over time.

OBJECTS AND SUMMARY OF THE INVENTION

It is accordingly a principal object of the present invention to provide an improved fastening mechanism for attaching power transmission and related fixtures to utility poles which does not require the formation of through bores and which is light weight and easy to work with such that a lineman can readily perform the required operations in quick fashion with minimal physical exertion.

It is a further object of the present invention to provide an improved fastening mechanism for attaching power lines and related fixtures to utility poles which reduces the overall number of parts which a lineman must handle while at the top of the utility pole so as to minimize the chance of fumbling or dropping parts during installation and/or repair operations.

It is a still further object of the present invention to provide an improved fastening mechanism for attaching power lines and related fixtures to utility poles which dissipates the electricity from a lightning strike away from the center of the utility pole so as to protect the structural integrity of the utility pole and the various fixtures.

It is yet another object of the present invention to provide an improved fastening mechanism for attaching power lines and related fixtures to utility poles which is low profile relative to the circumference of the utility pole so as to minimize the risk of snagging the lineman's protective clothing and/or rubber insulating covers.

It is a further object of the present invention to provide an improved fastening mechanism for attaching power lines and related fixtures to utility poles which is capable of flexing to accommodate the various contraction and expansion of utility poles without loosening while at the same time providing a sturdy attachment such that the fixtures will not shift or slide down the utility pole over time.

In accordance with the present invention, the foregoing objects and advantages are achieved by providing a utility pole clamp capable of being fixedly yet flexibly secured around the circumference of a utility pole for attaching any of a variety of fixtures to the utility pole, including but not limited to insulators, eye bolts, cross arm members, and brace members. The utility pole clamp of the present invention includes an electrically conductive band member for placement about the circumference of the utility pole, a locking mechanism for resiliently biasing the band member against the utility pole to thereby fixedly yet flexibly secure the band member to the utility pole, and in certain applications, a mounting block having at least one receiving aperture for rigidly coupling any of a variety of fixtures to the band member.

The band member is light weight and preferably constructed from sheet metal, such as stainless steel, having sufficient thickness and tear-out strength to withstand heavy loading when disposed on the utility pole. The band member may alternately be constructed from carbon reinforced plastic and/or plastic having internally disposed copper or metallic inserts, so long as the band member is generally electrically conductive. In most applications, the electrical conductivity of the band member serves to dissipate stray voltages caused by improper grounding, unbalanced loading, or line loss or a line inadvertently becoming energized during repair. In these applications, a ground cluster may be achieved, or alternatively a single point grounding may be facilitated. Moreover, the band member effectively creates a conductive path about the periphery of the utility pole such that the electrical energy from a lightning strike will be dissipated around the entire outer surface of the utility pole rather than through the center of the pole as with a through-bolt fastening mechanism, thereby minimizing the likelihood of structural damage to the pole and/or fixtures during such conditions. The band member may also be provided with teeth members for gripping into the surface of the utility pole when secured to the utility pole, and to provide additional positive contact with the pole for grounding purposes.

The locking mechanism may be formed as a separate member or as an integral portion of the band member. In a preferred embodiment, the locking mechanism comprises an over-center latch capable of engaging with complimentary grooves formed in the band member to thereby fixedly and flexibly secure the band member to the utility pole. Alternate and/or supplemental locking mechanisms may also be provided, including but not limited to an interlocking detent arrangement, a mating tab/aperture arrangement, and a cooperating flange/bolt arrangement. These locking mechanisms are advantageously simple and easy to operate such that a lineman may secure the utility pole clamp in quick fashion with minimal physical exertion.

The receiving apertures within the mounting block are preferably formed as industry standard threaded bores capable of accepting any number of industry standard threaded fixtures, i.e. low profile bolt members, eye bolts, and insulators, such that the lineman is not required to drill or form any bores through the utility pole for the purposes of attaching such fixtures. This provides improved versatility over the through-bolt fastening mechanism by allowing a lineman to quickly and easily install and remove various fixtures into and from the receiving apertures. This also reduces the overall number of parts which a lineman must handle while at the top of the utility pole so as to minimize the chance of fumbling or dropping parts during installation and/or repair operations.

The utility pole clamp of the present invention is advantageously capable of securing any of a variety of utility pole fixtures in a low profile fashion so as to minimize the risk of snagging or damaging the lineman's protective clothing and/or interfering with the installation of rubber insulating covers. Moreover, the utility pole clamp is advantageously capable of flexing to accommodate the contraction and expansion of utility poles while providing a sturdy attachment such that the fixtures will not shift or slide down the utility pole over time.

The foregoing features and advantages of the present invention will be readily apparent to those skilled in the art from a review of the following detailed description of the preferred embodiment in conjunction with the accompanying drawings and claims.

BRIEF DESCRIPTION OF THE DRAWINGS

FIG. 5 is a perspective view of a utility pole clamp 30 provided in accordance with a third preferred embodiment of the present invention;

FIG. 6 is a perspective view of a utility pole clamp 40 provided in accordance with a fourth preferred embodiment of the present invention;

DETAILED DESCRIPTION OF THE PREFERRED EMBODIMENT

Figure 1:
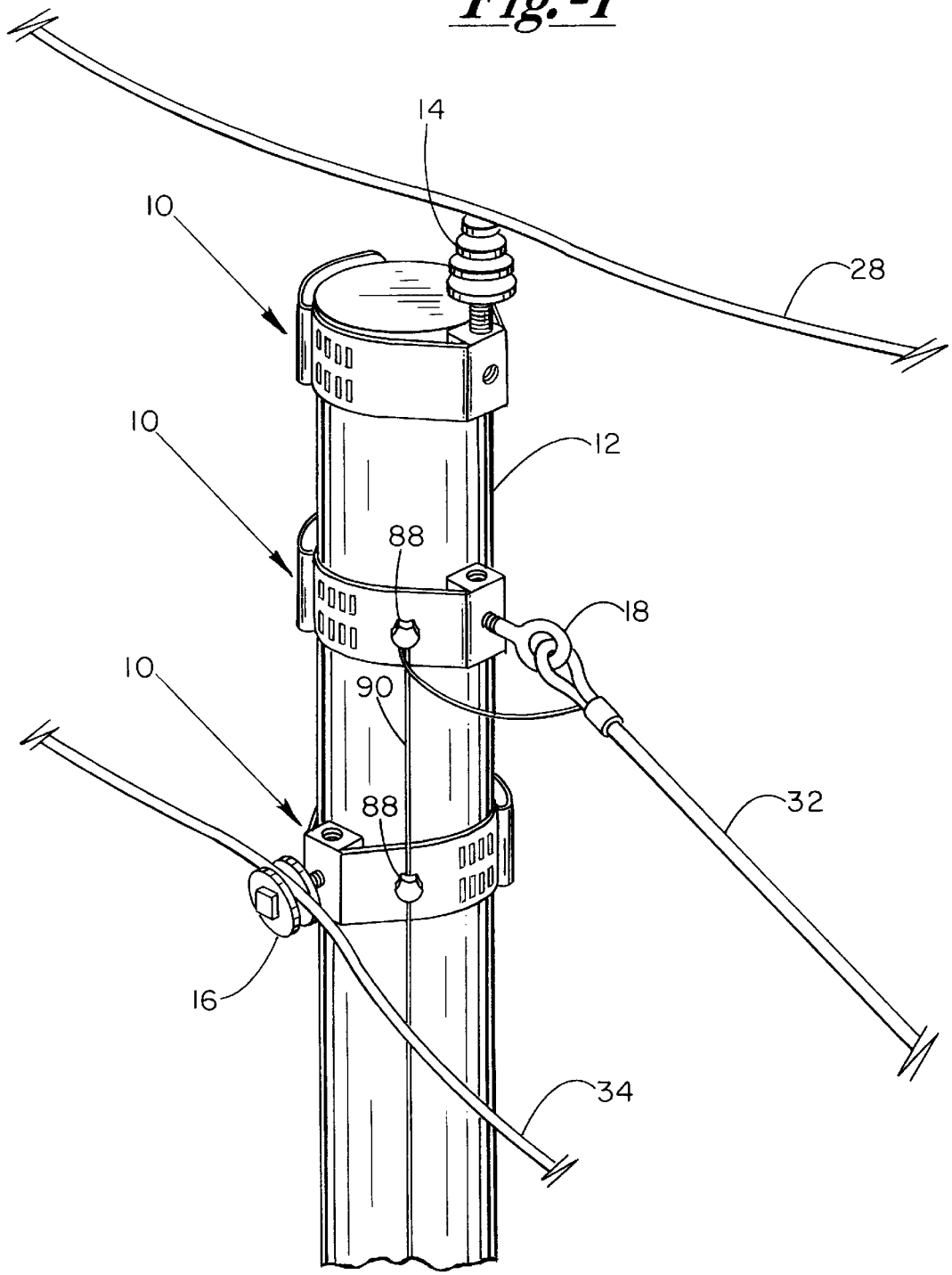
FIG. 1 is a perspective view illustrating a plurality of utility pole clamps 10 of the present invention secured to a utility pole 12 for fixedly receiving a top-mount insulator 14, a side-mount insulator 16, an eye-bolt 18, and ground cluster 90, in accordance with one broad aspect or feature of the present invention.
Figure 2:
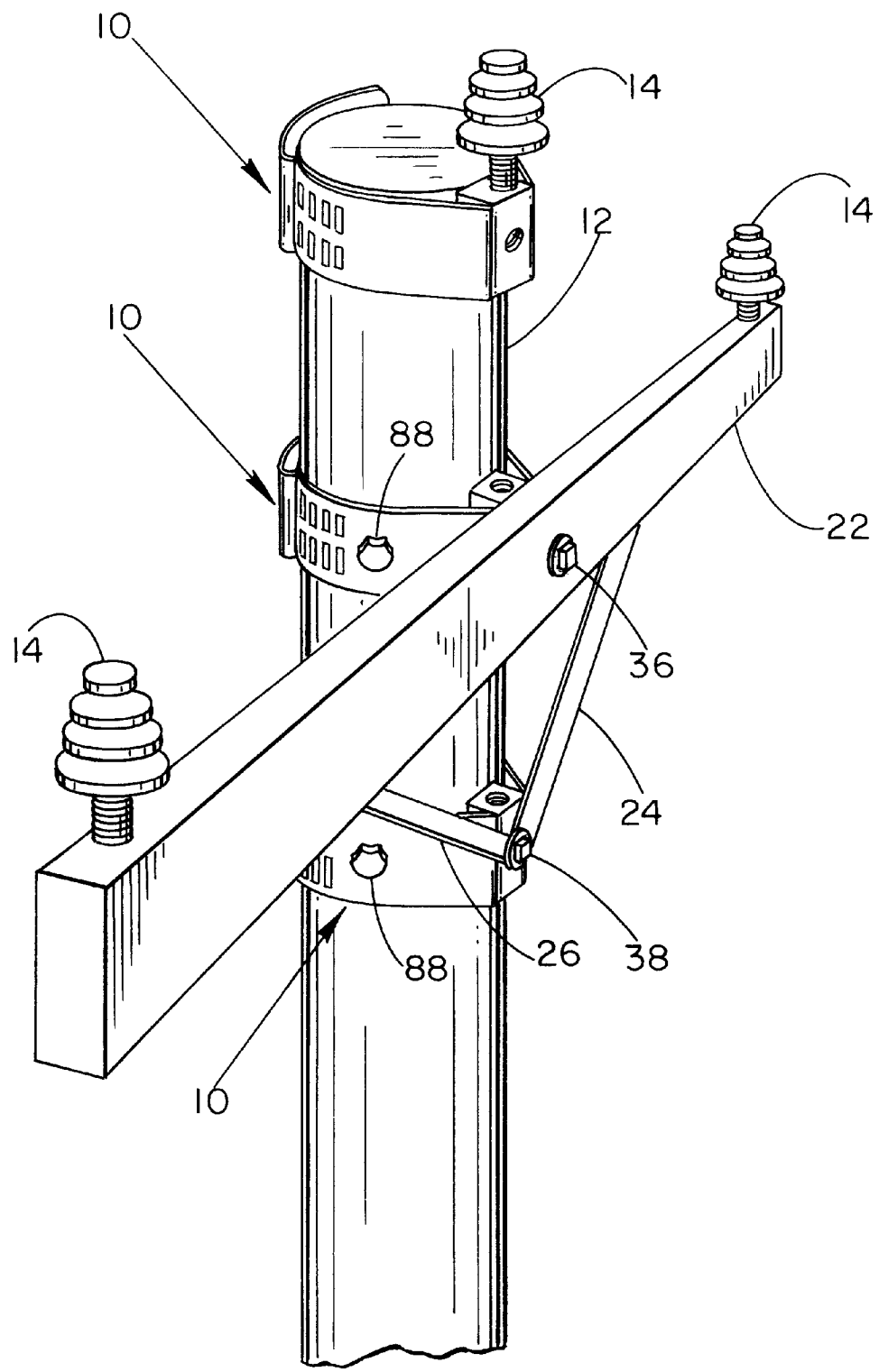
FIG. 2 is a perspective view illustrating a plurality of utility pole clamps 10 of the present invention secured to a utility pole 12 for mounting a cross arm member 22 and complementary brace members 24, 26 in accordance with yet another broad aspect of the present invention.

FIGS. 1 and 2 illustrate a plurality of utility pole clamps 10 provided in accordance with a first preferred embodiment of the present invention applied to a common utility pole 12. In FIG. 1, the upper utility pole clamp 10 has a top-mount insulator 14 coupled thereto for supporting an upper cable 28, the middle utility pole clamp 10 has an eye-bolt 18 coupled thereto for attachment to a guy-wire 32, and the lower utility pole clamp 10 has a side-mount insulator 16 coupled thereto for supporting a lower cable 34. To further illustrate the versatility of the present invention, FIG. 2 shows the middle utility pole clamp 10 having a cross arm member 22 coupled thereto via a low profile bolt 36 for supporting a pair of top-mount insulators 14 laterally away from the utility pole 12, wherein the lower utility pole clamp 10 has first and second brace members 24, 26 coupled thereto via a low profile bolt 38 for supporting the cross arm member 22. As will be set forth in greater detail below, the utility pole clamps provided in accordance with the present invention provide a light weight, versatile, safe, and economical alternative to the through-bolt fastening mechanisms typically employed in prior art utility pole applications.

Figure 3:
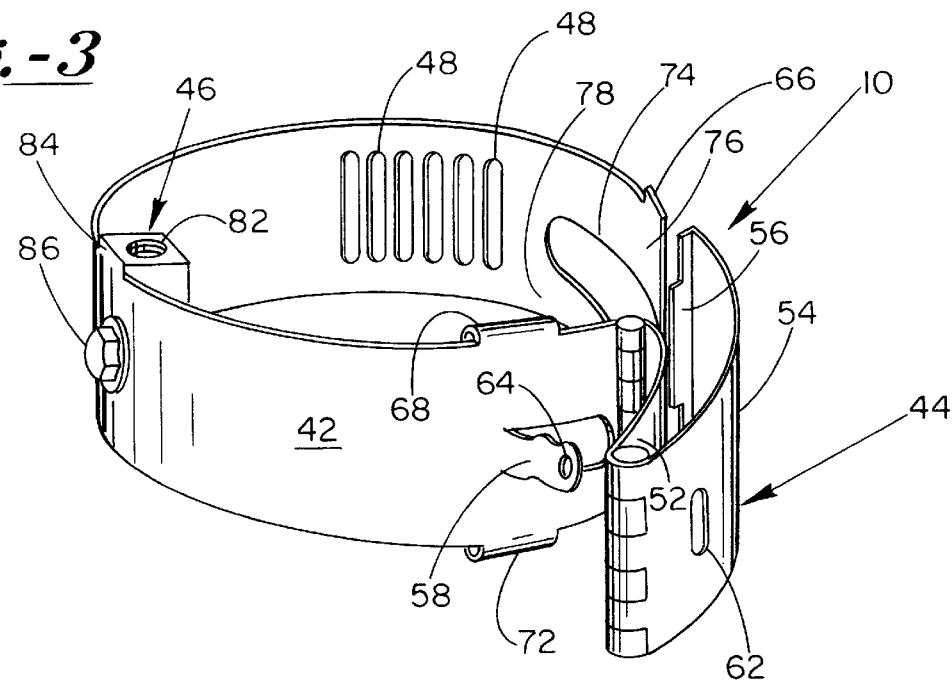
FIG. 3 is a perspective view of the utility pole clamp 10 shown in FIGS. 1 and 2 provided in accordance with a first preferred embodiment of the present invention.

With reference to FIG. 3, each utility pole clamp 10 of the first preferred embodiment includes a band member 42, a primary locking mechanism comprising an over-center latch 44 hingedly attached to the band member 42, and a mounting block 46. The band member 42 may be constructed from any number of generally conductive materials, including but not limited to heat treated steel, stainless steel, carbon reinforced plastic, or plastic having embedded conductive elements such as copper fiber. The band member 42 includes a plurality of engagement grooves 48 disposed a predetermined distance from the over-center latch 44. The engagement grooves 48 are generally parallel to one another and provide a variety of purchase points for the over-center latch 44. More specifically, the over-center latch 44 includes an inner latch member 52 hingedly coupled to an outer latch member 54, wherein the outer latch member 54 includes an engagement lip 56 capable of being received within any of the engagement grooves 48 of the band member 42. The inner latch member 52 is hingedly coupled to the band member 42 such that the over-center latch 44 may be quickly and easily manipulated to position the engagement lip 56 into a selected one of the engagement grooves 48. The over-center latch 44 may thereafter be closed to secure the band member 42 on a utility pole by manipulating the inner and outer latch members 52, 54 in reverse fashion such that they reside in a generally flush and mating relationship against the band member 42.

In an important aspect of the present invention, the over-center latch 44 is tensioned such that it is capable of resiliently biasing the band member 42 against a utility pole with sufficient force to maintain the utility pole clamp 10 in a fixed vertical position under heavy loading conditions. In yet another significant aspect, the over-center latch 44 provides a generally spring-loaded coupling such that the utility pole clamp 10 may readily flex to accommodate any expansion and/or contraction experienced by the utility pole. As further assurance against having the band member 42 loosen or slip from its position on a utility pole, any of a variety of supplemental locking mechanisms may be provided. For example, in the preferred embodiment a secondary locking mechanism is shown comprising a tab member 58 extending outwardly from the band member 42, a complementary aperture (not shown) formed in the inner latch member 52, and a complementary aperture 62 formed in the outer latch member 54. In this arrangement, the tab member 58 is designed to extend through the complementary aperture (not shown) of the inner latch member 52 and the complementary aperture 62 of the outer latch member 54 when the over-center latch 44 is in the fully closed position shown in FIGS. 1 and 2. A hole 64 is further provided in the tab member 58 for receiving any type of lock or other obstruction device such that the over-center latch 44 will be locked or otherwise maintained in the closed position.

A tertiary locking mechanism may be further provided comprising a first detent member 66, a second detent member (not shown) disposed opposite the first detent member 66, a first engagement lip 68 for cooperating with the first detent member 66, and a second engagement lip 72 for cooperating with the second detent member (not shown). The first detent member 66 and the second detent member (not shown) are respectively formed along the upper and lower edges of the band member 42 proximate a first end thereof and comprise generally triangular notches capable of sliding through and past the first and second engagement lips 68, 72, respectively, during the closing of the over-center latch 44. To facilitate this engagement, a flex aperture 74 may be formed in the band member 42 in between the first detent member 66 and the second detent member (not shown) to define an upper member 76 and a lower arm member 78. The flex aperture 74 is dimensioned such that the upper and lower arm members 76, 78 may yield or bend slightly during the closure of the over-center latch 44 to accommodate the passage of the first detent member 66 through and past the first engagement lip 68 and the passage of the second detent member (not shown) through and past the second engagement lip 72. In an important aspect, the triangular nature of the first detent member 66 and the second detent member (not shown) is such that they will not pass back through the first and second engagement lips 68, 72 except when a lineman intentionally biases the upper and lower arm members 76, 78 toward one another. This advantageously serves as yet another line of defense in securing the band member 42 to a utility pole.

The mounting block 46 comprises a generally rectangular article disposed along the inner surface of the band member 42. The mounting block 46 may be constructed from any variety of rigid and durable materials, including but not limited to metal and carbon reinforced plastic. In the preferred embodiment, the mounting block 46 is equipped with an upper receiving aperture 82 and a side receiving aperture (not shown) each having a threaded interior for threadably receiving various threaded utility pole fixtures. With brief reference to FIGS. 1 and 2, such fixtures may include, but are not necessarily limited to, the top-mount insulator 14, the side-mount insulator 16, the eye-bolt 18, and the low profile bolts 36, 38. Returning to FIG. 3, the mounting block 46 may be fixed along the inner surface of the band member 42 by crimping portions of the upper and lower edges to envelope the top and bottom of the outermost edge of the mounting block 46 such as at 84. As alternative or supplemental fixing means, a low profile bolt 86 may be provided through an aperture formed in the band member 42 for threaded receipt in the side receiving aperture (not shown) of the mounting block 46.

As illustrated in FIGS. 1 and 2, the utility pole clamp 10 of the present invention is configured such that, when secured to the utility pole 12, the mounting block 46 is disposed generally opposite from the over-center latch 44. The primary reason that the utility pole clamp 10 will remain at the same approximate vertical position on the utility pole 12 when fully loaded, i.e. under the weight of the upper cable 28, the lower cable 34, the guy-wire 32, the cross arm member 22, and/or the brace members 24, 26, is due to the resultant torque acting upon the band member 42. For further assurance against vertical slippage, low profile bolt and/or screw members 88 may be provided through the band member 42 which extend a nominal distance into the utility pole 12. In a preferred embodiment, such low profile bolt and/or screw members 88 may also advantageously double as an attachment for a ground cluster, such as by coupling a ground wire 90 between the lower and middle utility pole clamps and the guy-wire 32 and/or earth ground wire. It may also advantageously be double or an attachment for single point grounding. The feature of single point grounding forms an important aspect of the present invention in that a conductive line or jumper may connect to a utility pole clamp 10 located below the lineman such that if a live wire or line 28 becomes energized, energy will be safely dissipated past the lineman to neutral wire or earth ground such as through a jumper from a conductive line or ground wire 90 to the clamp.

Figure 4:
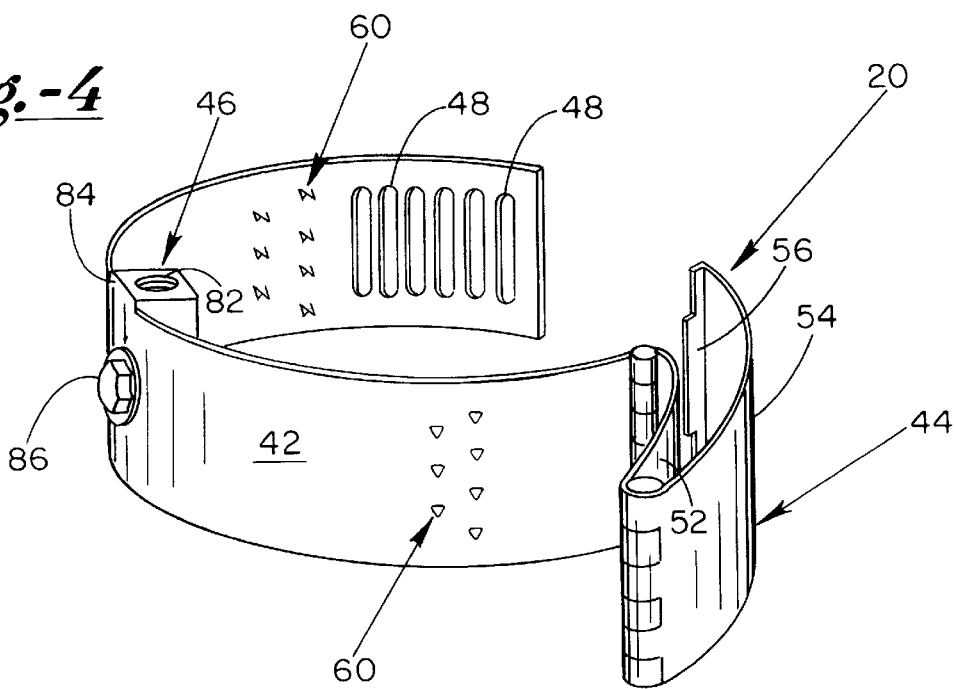
FIG. 4 is a perspective view of a utility pole clamp 20 provided in accordance with a second preferred embodiment of the present invention.

Turning now to FIG. 4, shown is a utility pole clamp 20 provided in accordance with a second preferred embodiment of the present invention. The utility pole clamp 20 has the same basic configuration as the utility pole clamp 20 illustrated in FIG. 3, including a band member 42 having a plurality of engagement grooves 48, a primary locking mechanism comprising an over-center latch 44 hingedly attached to the band member 42, and a mounting block 46 for fixedly coupling any of a variety of utility pole fixtures to the band member 42. The over-center latch 44 and mounting block 46 are essentially identical in construction and function as that shown in FIG. 3. As a result, these features will not be described further other than to point out that this embodiment does not include a secondary locking mechanism such that the inner and outer latch members 52, 54 of the over-center latch 44 do not include any complementary apertures for receiving a tab member as described above. The band member 42 is constructed to include a plurality of teeth members shown generally at 60 extending generally inward from the inner surface of the band member 42. As will be appreciated, the teeth members 53 serve to penetrate the exterior surface of a utility pole when the utility pole clamp 20 is in use so as to fortify the vertical stability of the utility pole clamp 20, further protecting against potential slippage during heavy loading conditions. The teeth members 53 furthermore provide a strain relief function by increasing the overall friction between the band member 42 and the pole 12 so as to lessen the degree of stress exerted upon the latch 44. They also assure positive contact between the pole and the clamp for facilitating increased electrical contact.

FIG. 5 represents a utility pole clamp 30 of a third preferred embodiment of the present invention. The utility pole clamp 30 comprises a band member 42 having an upper row of engagement grooves 48a and a lower row of engagement grooves 48b, a primary locking mechanism comprising an over-center latch 44 hingedly attached to the band member 42, and a mounting block 46 for fixedly coupling any of a variety of utility pole fixtures to the band member 42. The over-center latch 44 similarly includes an inner latch member 52 and an outer latch member 54. However, in contradistinction to the embodiments shown in FIGS. 3 and 4, the outer latch member 54 is hingedly attached to the band member 42 while the inner latch member 52 is formed to include an upper engagement lip 70 and a lower engagement lip (not shown) for cooperating with the upper and lower engagement grooves 48a, 48b, respectively. Notwithstanding this modification, the over-center latch 44 of this embodiment nonetheless remains easy to operate such that the band member 42 may be quickly and easily secured about a utility pole. More specifically, this task is accomplished by first manipulating the inner and outer latch members 52, 54 such that the upper engagement lip 70 and the lower engagement lip (not shown) are disposed within a selected pair of vertically adjacent engagement grooves 48a, 48b. Thereafter, the inner and outer latch members 52, 54 are forced into a flush and mating relationship against the band member 42 such that the band member 42 is resiliently biased against the utility pole with sufficient force to maintain the utility pole clamp 30 in a fixed vertical position under heavy loading conditions.

The over-center latch 44 forms an important feature of the present invention in that it provides a compression-type coupling having a generally spring-loaded characteristic which allows the utility pole clamp 30 to flex and thus accommodate the expansion and/or contraction of the utility pole over time. The fact that the over-center latch 44 is in compression is particularly advantageous because the latch 44 is therefore capable of absorbing substantially all of the force associated with the circumferential tension present while fastened about a utility pole, and is not limited by the strength of insertion tabs. Another significant feature of the utility pole clamp 30 resides in the formation of the upper engagement grooves 48a, 48b. More specifically, the upper and lower engagement grooves 48a, 48b increase the overall tearout strength of the band 42 by minimizing the strain experienced by the band 42 as a result of the upper engagement lip 70 and the lower engagement lip (not shown). The upper and lower engagement grooves 48a, 48b each accept one half of the total strain experienced by the band 42, with one quarter of the total strain being directed at each end of the upper engagement groove 48a and one quarter of the total strain being directed at each end of the lower engagement groove 48b. Additional or multiple engagement grooves may be provided.

While the over-center latch 44 is highly stable and secure when fully closed about a utility pole, this design may be further fortified by adding any number of supplemental locking mechanisms, such as a secondary locking mechanism comprising a tab member 80 extending outwardly from the inner latch member 52 and a complementary aperture 100 formed in the outer latch member 54. The tab member 80 is designed to extend through the complementary aperture 100 of the outer latch member 54 when the over-center latch 44 is in a fully closed position. The tab member 80 may further include a hole 102 for receiving any of a variety of locks or other obstruction devices such that the over-center latch 44 may be locked or otherwise secured while in the closed position.

FIG. 6 illustrates a utility pole clamp 40 provided in accordance with a fourth preferred embodiment of the present invention. The utility pole clamp 40 has the same basic configuration as that shown in FIG. 5, including a band member 42 having an upper row of engagement grooves 48a and a lower row of engagement grooves 48b, a primary locking mechanism comprising an over-center latch 44 hingedly attached to the band member 42, and a mounting block 46 for fixedly coupling any of a variety of utility pole fixtures to the band member 42. The sole distinction is that the over-center latch 44 is formed as an integral extension of the band member 42. More specifically, the outer latch member 54 is hingedly coupled to the band member 42 via a first living hinge 104 and the inner and outer latch members 52, 54 are coupled together via a second living hinge 106. Notwithstanding this change, the over-center latch 44 performs in the same fashion as described above, with the first and second living hinges 104, 106 cooperating with the inner and outer latch members 52, 54 to provide a spring-loaded coupling which allows the utility pole clamp 40 to flex and thus accommodate the expansion and/or contraction of the utility pole over time.

Figure 7:
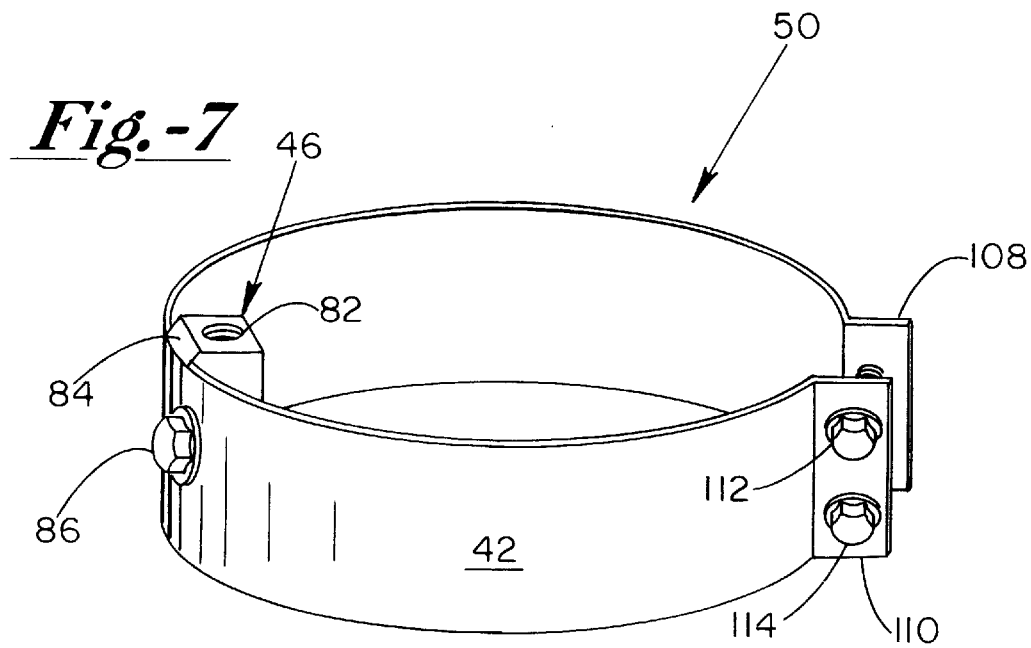
FIG. 7 is a perspective view of a utility pole clamp 50 provided in accordance with a fifth preferred embodiment of the present invention.

Turning now to FIG. 7, shown is a utility pole clamp 50 provided in accordance with a fifth preferred embodiment of the present invention. The utility pole clamp 50 includes a band member 42 having a first flange member 108 and a second flange member 110, a primary locking mechanism comprising a pair of low profile bolts 112, 114 for securely mating the first and second flange members 108, 110, and a mounting block 46 for fixedly coupling any of a variety of utility pole fixtures to the band member 42. The flange members 108, 110 may be dimensioned such that, when biased together with the low profile bolts 112, 114, they resiliently bias the band member 42 against a utility pole with sufficient force to maintain the utility pole clamp 50 in a fixed vertical position and, moreover, provide a generally spring-loaded coupling such that the utility pole clamp 50 may readily flex to accommodate any expansion and/or contraction experienced by the utility pole.

Figure 8:
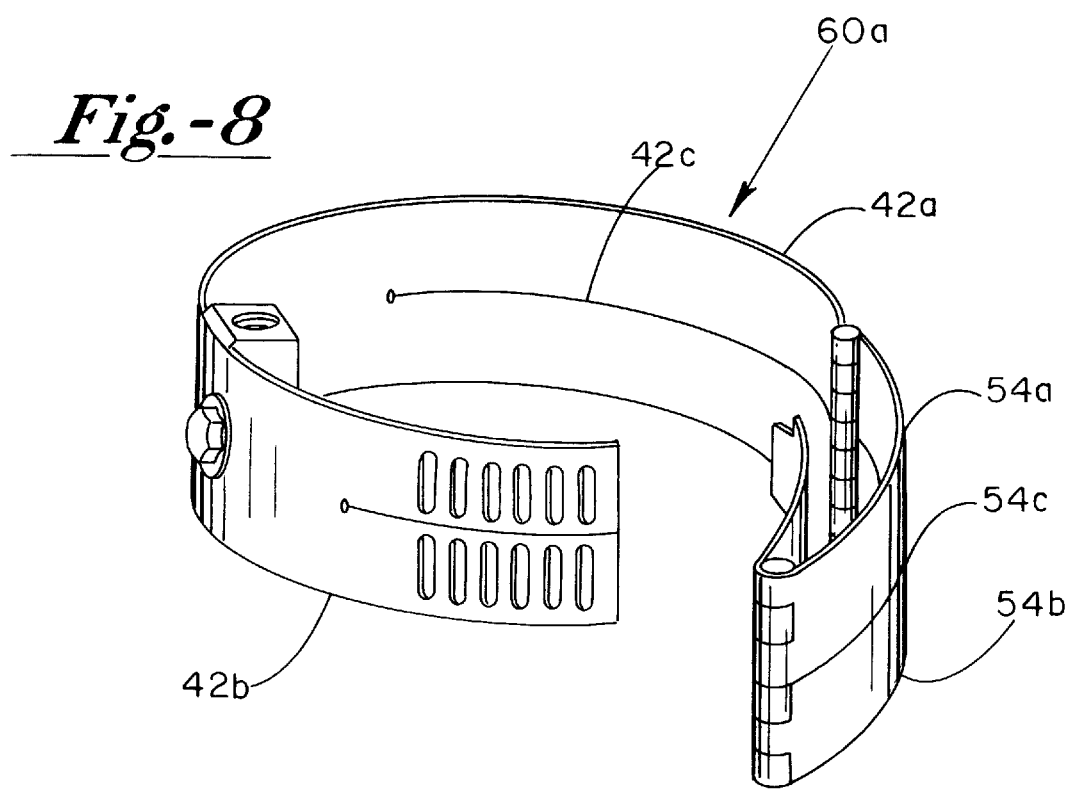
FIG. 8 is a perspective view of a utility pole clamp 60 provided in accordance with a sixth preferred embodiment of the present invention.

Referring lastly to FIG. 8, shown is a utility pole clamp shown generally at 60A provided in accordance with a sixth preferred embodiment of the present invention. The utility pole clamp 60 has the same basic configuration as that shown in FIG. 5, including a band member 42 having an upper row of engagement grooves 48a and a lower row of engagement grooves 48b, a primary locking mechanism comprising an over-center latch 44 hingedly attached to the band member 42, and a mounting block 46 for fixedly coupling any of a variety of utility pole fixtures to the band member 42. The main distinction is that the band member 42 and over-center latch 44 are provided in a split configuration. More specifically, the band member 42 includes an upper band member 42a and a lower band member 42b divided by a cut-line 42c, while the over-center latch 44 includes an upper outer latch member 54a and a lower outer latch member 54b divided by a cut-line 54c, and an upper inner latch member 52a and a lower inner latch member (not shown) divided by a cut-line (not shown).

In a preferred embodiment, the band member 42 is split into the upper band member 42a and the lower band member 42b in two separate areas, namely in between the upper and lower engagement grooves 48a, 48b and a span extending a predetermined distance from the hinged coupling with the over-center latch 44 towards the mounting block 46. The over-center latch 44 of the utility pole clamp 60A performs in the same fashion as described above with reference to FIG. 5, with the upper and lower outer latch members 54a, 54b and the upper and lower inner latch members 52a, (not shown) cooperating with the upper and lower engagement grooves 48a, 48b in a compression configuration which allows the utility pole clamp 60A to flex and thus accommodate the expansion and/or contraction of the utility pole over time. The advantage of the compression-type coupling, once again, is that the over-center latch 44 is capable of absorbing substantially all of the force associated with the circumferential tension of the utility pole clamp and not limited by the strength of the tabs.

In an important aspect of the present invention, the split configuration of the utility pole clamp 60A advantageously allows the upper and lower portions of the band member 42 to be tightened individually such that the utility pole clamp 60A is readily capable of accommodating surface irregularities on the utility pole which, by way of example and not limitation, may include knots formed in the utility pole or the taper of the utility pole. As will be appreciated by those skilled in the art, the utility pole clamp 60A is capable of accommodating such surface irregularities due to the fact that the upper and lower band members 42a, 42b, the upper and lower outer latch a members 54a, 54b, and the upper and lower inner latch members 52a, (not shown) are provided such that the upper and lower portions of the utility pole clamp 60A may be selectively adjusted to have different circumferences. If the utility pole has an upwardly extending inward taper, then, the upper portion of the utility pole clamp 60A may be adjusted to be tighter, i.e. having a smaller circumference, than the lower portion of the utility pole clamp 60A such that the upper portion thereof is adequately secured about the utility pole. This ensures that the utility pole clamp 60A will be affixed to the utility pole in the tightest and most secure possible fashion, thereby increasing the overall safety and reliability of the utility pole clamp 60A.

In light of the foregoing, the present invention solves the various drawbacks found in the prior art by providing an improved fastening mechanism for attaching power transmission and related fixtures to utility poles. The improved fastening mechanism comprises a utility pole clamp which does not require the formation of through bores and is light weight and easy to work with such that a lineman can readily perform the required operations in quick fashion with minimal physical exertion. The utility pole clamp of the present invention reduces the overall number of parts which a lineman must handle while at the top of the utility pole, thereby minimizing the likelihood of fumbling or dropping parts during installation and/or repair operations. The utility pole clamp set forth above may also provide single point grounding or a ground cluster when employed, thereby improving safety of the lineman during installation and service operations. The aforementioned utility pole clamp furthermore advantageously dissipates the electricity from a lightning strike away from the center of the utility pole so as to protect the structural integrity of the utility pole and related fixtures. Moreover, the utility pole clamp of the present invention is low profile relative to the utility pole so as to minimize the risk of snagging the lineman's clothing and/or rubber insulating covers. The utility pole clamp of the present invention is furthermore capable of flexing to accommodate the contraction and expansion of utility poles without loosening while at the same time providing a sturdy attachment such that the fixtures will not shift or slide down the utility pole over time.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

In this regard, it is to be readily understood that the various teachings set forth above with reference to FIGS. 3–8 may be combined, modified, and/or simplified in any number of different fashions without departing from the scope of the present invention. For example, although mounting blocks are illustrated in each of the foregoing embodiments, it is to be readily understood that the mounting blocks may be formed in any number of different configurations and shapes or, alternatively, the mounting blocks may be omitted altogether depending upon the application.

What is claimed is:

1. Fastening means for use in securing electrical power, communication and signal transmission lines and cables to a line supporting utility pole and comprising:

(a) an electrically conductive band member for circumferentially encircling said line supporting utility pole;

(b) said electrically conductive band member comprising an integral locking means for resilient biased engagement with and in tension about said line supporting utility pole so as to fixedly and flexibly secure said electrically conductive band member about the circumference of said line supporting utility pole;

(c) a mounting block means coupled to said electrically conductive band member having at least one receiving aperture formed therein for rigidly securing a transmission line or cable engaging fixture thereto;

(d) said electrically conductive band member is provided with radially inwardly extending pole engaging teeth;

(e) said locking means comprises an over-center latch;

(f) supplemental locking means are provided for maintaining said electrically conductive band member in position on said line supporting utility pole; and (g) said supplemental locking means comprising interlocking detent-teeth.

* * * * *